Sept. 14, 1937.  W. F. ZIELSDORF  2,092,947
REFRIGERATOR
Filed Jan. 24, 1936   5 Sheets-Sheet 1
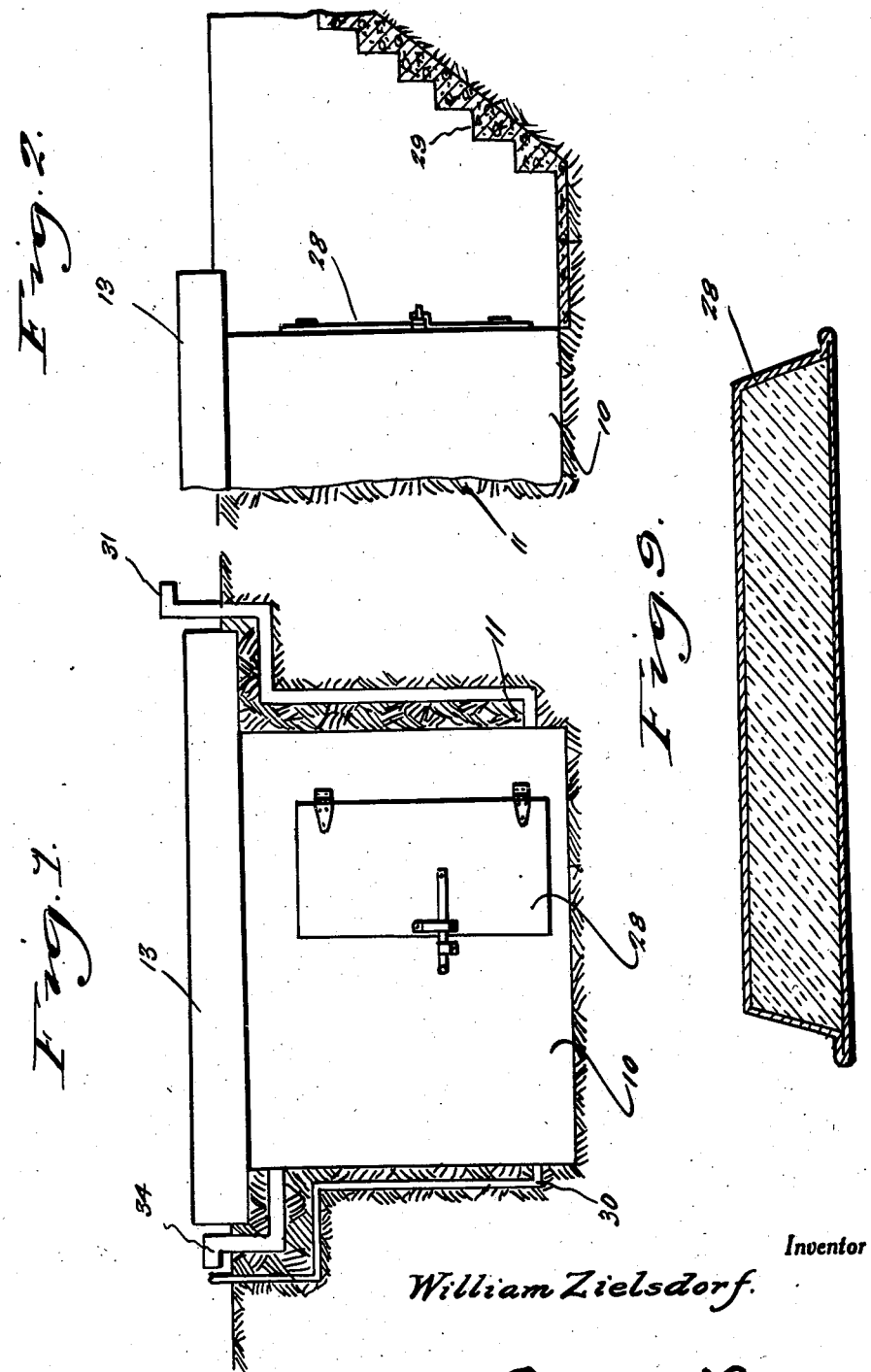
Inventor
William Zielsdorf.
By _Clarence A. O'Brien_ and
Hyman Berman Attorneys Sept. 14, 1937.  W. F. ZIELSDORF  2,092,947
REFRIGERATOR
Filed Jan. 24, 1936   5 Sheets-Sheet 2

Inventor
William Zielsdorf

By Clarence A. O'Brien and
Hyman Berman, Attorneys

Sept. 14, 1937.   W. F. ZIELSDORF   2,092,947
REFRIGERATOR
Filed Jan. 24, 1936   5 Sheets—Sheet 3
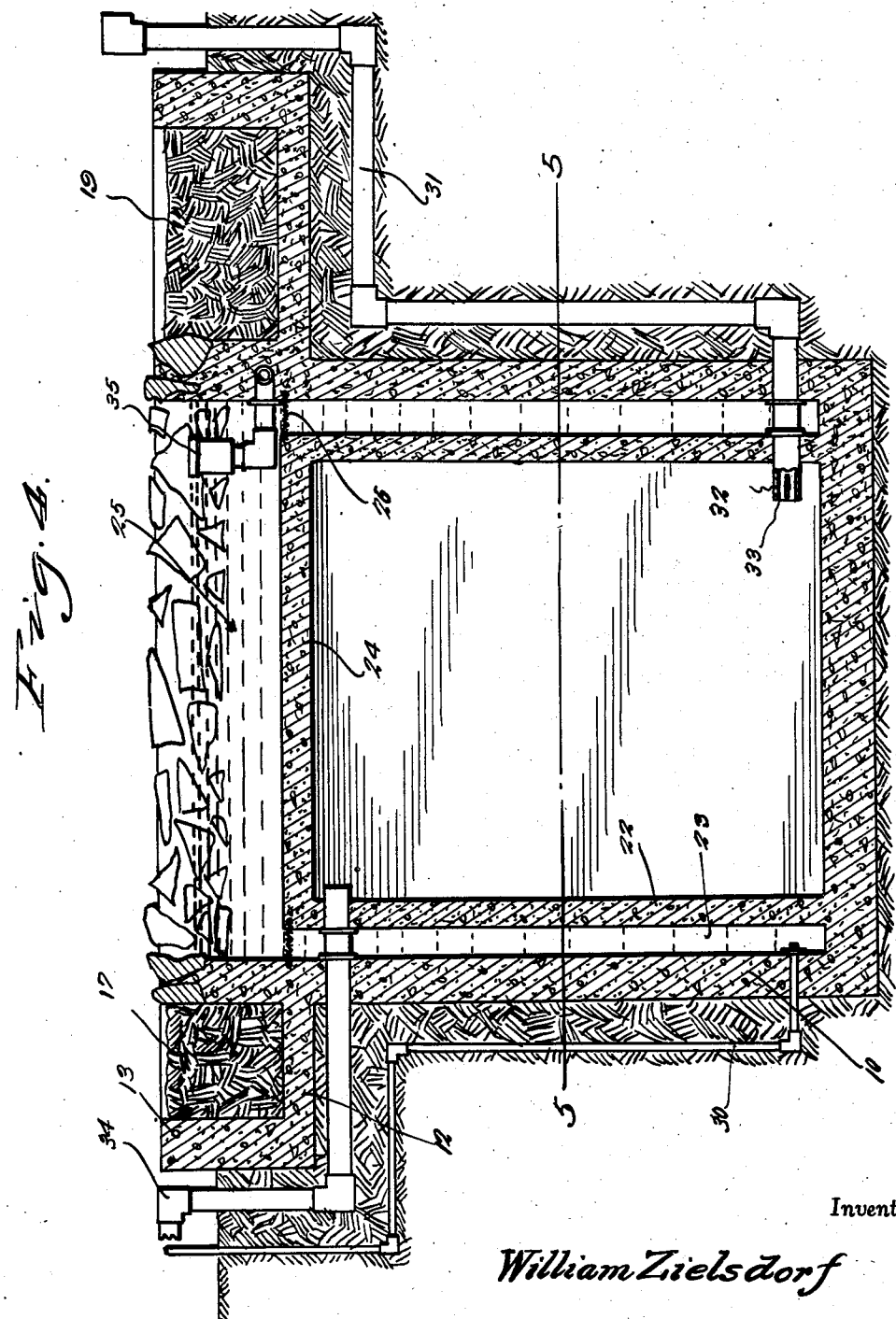
Inventor
William Zielsdorf
By Clarence A O'Brien and
Hyman Berman Attorneys

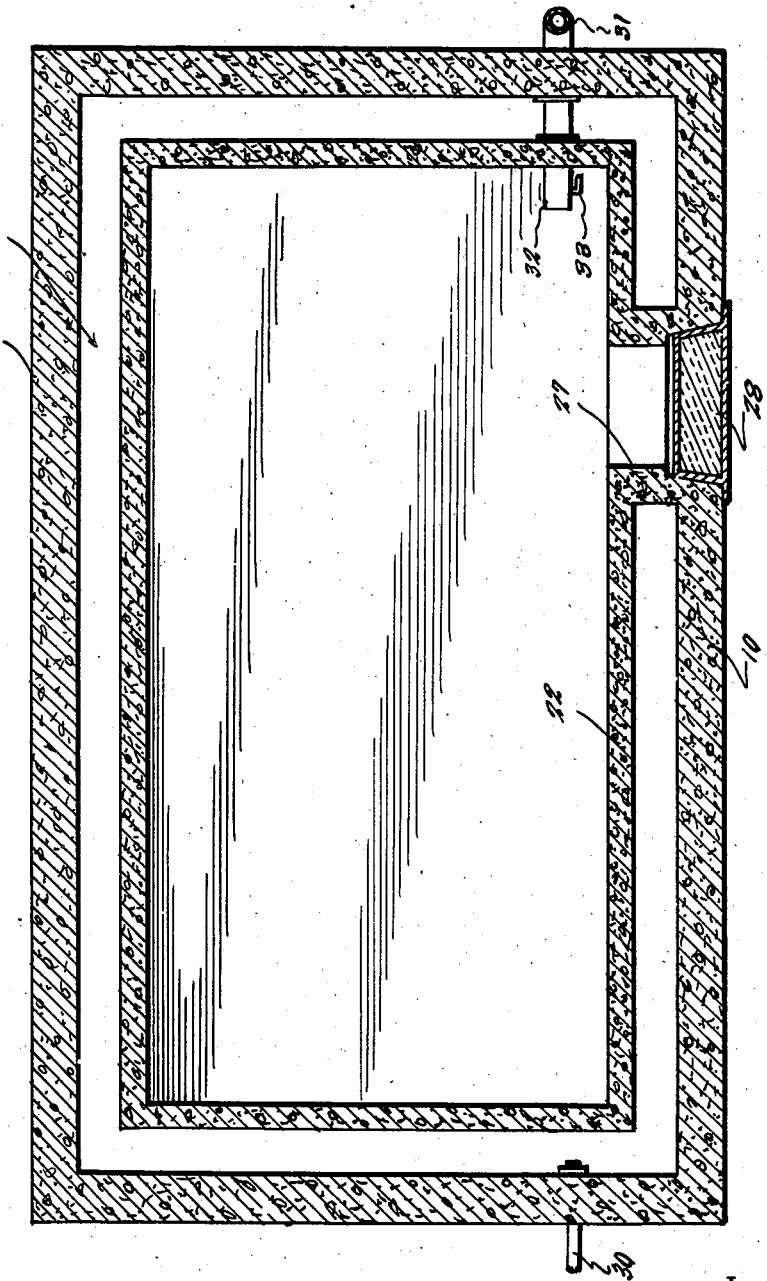

Sept. 14, 1937.  W. F. ZIELSDORF  2,092,947
REFRIGERATOR
Filed Jan. 24, 1936  5 Sheets—Sheet 5
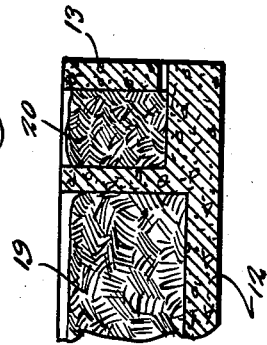
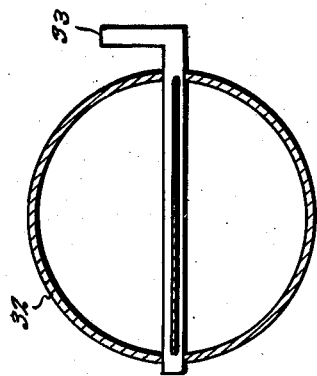
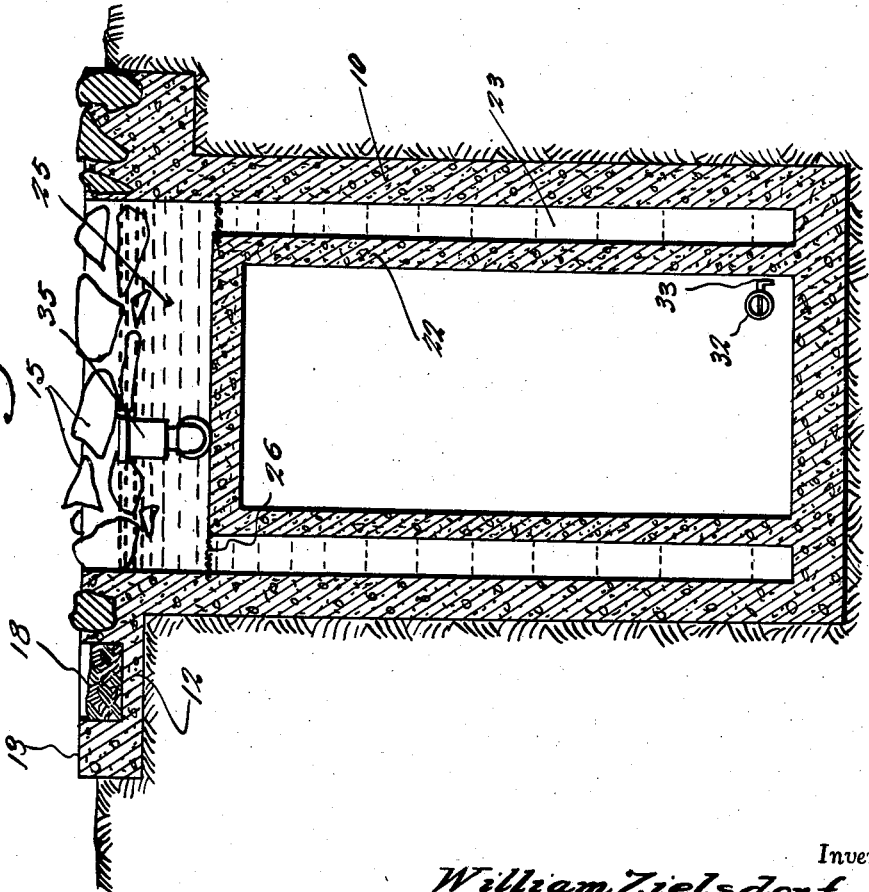
Inventor
William Zielsdorf
By Clarence A. O'Brien and
Hyman Berman  Attorneys Patented Sept. 14, 1937

2,092,947

UNITED STATES PATENT OFFICE 2,092,947

REFRIGERATOR

William F. Zielsdorf, St. Joseph, Mo.

Application January 24, 1936, Serial No. 60,744

2 Claims. (Cl. 257—17)

This invention relates to a composite structure characterized primarily by a concrete or equivalent multiple purpose unit having a coordination of features associated therewith in forming what is primarily a cooling or refrigerating system, but secondarily a so-called rock garden and companion lily pool.

Visualized from one viewpoint, I have evolved and produced a unique assemblage of mutually coacting parts forming a novel adaptation for out-of-doors use wherein the structure is susceptible of being submerged or sunk in the ground to have the double function of providing an ornamental garden pond and a coordinated enclosure susceptible of housing foodstuffs without the need of ice or other expensive cooling mediums.

Considered along other lines, one might be content to discern that novelty is predicated upon the adoption and use of a substantially unitary structure including a well adapted to be imbedded in the ground, said well being provided at its top with a rock garden and having associated therewith and located therein a hollow riser spaced from the walls of the well to permit water to be circulated therearound, and having an entrance door and other accessories permitting it to perform with requisite utility.

The conception is devoted to what is thought to be an innovation in this line of endeavor and is calculated to provide requisite features of balance and decorative appearance whereby to provide continuity of action from a standpoint of design and utility.

The explicit features and other accessories coordinated therewith which lend distinctiveness and individuality to the special development will become more readily apparent from the following description and the accompanying illustrative drawings.

In the accompanying pictorial drawings, wherein like numerals are employed to designate corresponding parts throughout the views:

Figure 1 is what may be referred to as a front elevational view of the structure disclosing the air circulating and water supply pipe and the concrete unit forming the major factor of the combination structure.

Figure 2 is a view at right angles to Figure 1 showing how access may be had by way of steps or the like to the pit and cooling chamber or enclosure.

Figure 4 is a central vertical or longitudinal sectional view taken approximately on the plane of the line 4—4 of Figure 3.

Figure 5 is a horizontal sectional view on the line 5—5 of Figure 4.

Figure 3:
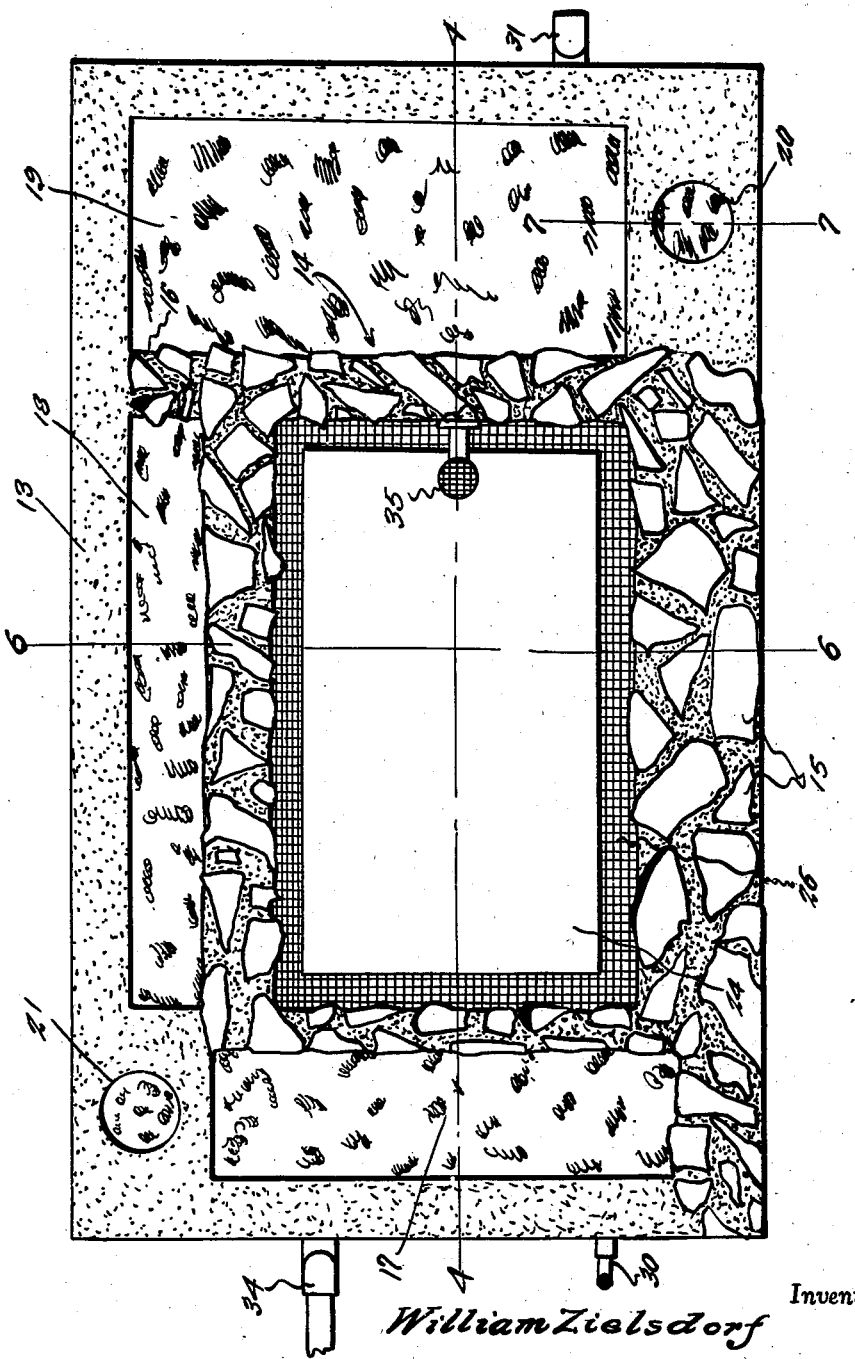
Figure 3 is a top plan view calculated to sufficiently represent the ornate as well as utilitarian features forming the so-called garden equipped lily pond or pool.

Figures 6 and 7 are transverse and detail sections on the lines 6—6 and 7—7, respectively, of Figure 3.

Figure 8 is an end sectional view of the valved air ventilating or inlet pipe.

Figure 9 is an enlarged horizontal section through the cooling chest or refrigerator door.

By way of introduction to the catalogue of parts, it is to be pointed out that the essential or major unit is in the nature of a concrete casting or form but may obviously be of any appropriate material. Under the circumstances the expression "concrete" is used advisedly to imply this more or less one-piece structure forming the predominating part of the composite structure. It is evident, too, as will be clear from the definition of the invention in the succeeding claims that the use of the expression "rock garden" is not necessarily limiting in scope, but is calculated to cover more or less the ornamental aspect of that part of the structure which is utilized to contain plants or other corresponding ornamentation. By the same token, although the preliminary part of the description implies the use of what is called "a lily pond or pool", this could obviously constitute a fish pond.

Broadly, then, as will be hereinafter clear, the conception has to do with a refrigerator having a closing door and adapted to serve to preserve food and similar provisions, this being surrounded by a coordinated structure which serves as a circulator for a continuous flow of water, the surrounding structure being embellished to cooperate with the coordinated refrigerator to afford the requisite features of design and ornamental novelty.

Referring now to the drawings by distinguishing numerals, attention is first called to the concrete unit which includes a part 10 susceptible of serving as a well. This may be of any configuration, but is here shown as of general rectangular form and is adapted to be submerged or imbedded in the ground 11 as indicated especially in Figures 1 and 2. At its top this portion of the structure is formed with an outstanding and surrounding tray-like receptacle. This includes a bottom 12 and an upstanding rim 13. In addition there is what may be described as an inner rim 14 having certain portions thereof disposed in spaced parallelism to the main or outer rim. This inner rim has ornamental rocks or the like 15 incorporated therein. As a matter of fact, the rocks may be also imbedded in the top portion of the outer rim. In any event we find that by making a connection between the inner and outer rims at the point 16 in Figure 3, the walls of the respective rims cooperate in defining some three distinguishable receptacles denoted by the numerals 17, 18, and 19. These are adapted to be filled with soil or equivalent material to function as flower beds. Being closely allied with the rock finished inner rim 14 these three areas 17, 18, and 19 cooperate therewith in forming the so-called unitary rock garden. It is of incidental importance to mention the sockets 20 and 21 also filled with dirt to function as secondary flower pots.

Referring now to Figure 4, it will be observed that there is a hollow concrete riser denoted by the numeral 22 and this has its vertical walls formed integral with the bottom of the well. These walls being spaced from the walls of the well provide a circulation space 23 for water. The top 24 of this enclosure terminates on a level about even with the outstanding garden bottom 12 and this forms the major bottom of the part unitarily called the lily pond or pool 25. The inner rim in reality forms the wall of the pool and the top of the refrigerator or enclosure as indicated at 24 forms the bottom. Attention is called at this time to the numeral 26 which designates a screen attached to the top of the refrigerator and adjacent the walls of the well as indicated to complete the bottom of the pool and to permit water circulation but to prevent obstructions getting down in the water circulating spaces 23.

Attention is called at this time to Figure 5 wherein it will be observed that the numeral 27 designates a doorway which is in effect a water tight concrete connection between the respective front walls of the refrigerator and well. The structure is so fashioned as to accommodate an appropriately constructed door 28. The door is appropriately mounted and provided with suitable closing and retention fixtures or accessories. As a general proposition, and as before implied, the entire structure is designed to be imbedded in the ground and the pit is so made as to accommodate a pair of steps or the like 29 as shown in Figure 2 leading down to the door to permit access to be had to the so-called refrigerator. This thus describes the major features of the concrete unit.

In practice I have found it expedient to deliver the water, which is continuously flowing, to the bottom of the well by way of water supply pipes 30 in Figure 4. Then, too, there is an air inlet conduit at the point 31, this being of appropriate construction and taking in air above the ground and leading it into the bottom of the refrigerator as indicated at 32. At this point is a regulating or venting valve 33 of suitable construction. The air circulates through the chest or refrigerator and is discharged by way of the exhaust or discharge line or pipe 34.

The numeral 35 designates an appropriately screened and constructed overflow pipe which is located in the lily pond and serves to determine the level of the water therein as is obvious. This pipe drains in any suitable way. Consequently, the structure is characterized by requisite ventilation, water supply, and water level control. The construction of the latter features is obviously incidental to the broad proposition of the properly constructed and coordinated members which go to make up the complete refrigerating system and the accompanying water pool and garden structure. The principal novelty, however, is predicated upon the hollow formation of the internal unit 22 coordinated with the well to provide a water circulating space therebetween so that the water which supplies the pond constitutes a cooling medium around the enclosure 22 permitting it to function as a satisfactory refrigerator.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a refrigeration structure of the class described, a well including a bottom and upstanding walls of predetermined height, a hollow chamber connected to the bottom and confined within said well having its top terminating on a plane below the corresponding portion of the well, the walls of said chamber being spaced from the walls of the well, a cooling medium surrounding the top and side walls of the chamber, said chamber constituting a refrigerating enclosure and being provided with an entrance door, screen means associated with the top of the chamber and adjacent portions of the walls of the well, and a horizontal rim surrounding the upper portion of the walls of the well in the manner and for the purposes described.

2. In a refrigeration structure of the class described, a well including a bottom and upstanding walls of predetermined height, a hollow chamber connected to the bottom and confined within said well having its top terminating on a plane below the corresponding portion of the well, the walls of said chamber being spaced from the walls of the well to provide a water circulating space, said chamber constituting a refrigerating enclosure and being provided with an entrance door, screen means associated with the top of the chamber and adjacent portions of the walls of the well, a horizontal rim surrounding the upper portion of the walls of the well in the manner and for the purposes described, together with a water supply pipe joined to the well, a water drain pipe joined to the upper portion of the well, and air supply and venting means connected with the refrigerator.

WILLIAM F. ZIELSDORF.